US006761580B2

(12) United States Patent
Chang

(10) Patent No.: US 6,761,580 B2
(45) Date of Patent: Jul. 13, 2004

(54) INTELLIGENT UNIVERSAL CONNECTOR

(76) Inventor: Cheng-Chun Chang, 11F-2, No. 11, Lane 202, Jing-Shing Road, Wen-Shan DT, Taipei (TW)

( * ) Notice: Subject to any disclaimer, the term of this patent is extended or adjusted under 35 U.S.C. 154(b) by 1 day.

(21) Appl. No.: 10/236,556

(22) Filed: Sep. 6, 2002

(65) Prior Publication Data

US 2004/0023522 A1 Feb. 5, 2004

(30) Foreign Application Priority Data

Aug. 1, 2002 (TW) ..................................... 91211815 U

(51) Int. Cl.$^{7}$ .......................... H01R 11/00; G06F 13/12

(52) U.S. Cl. .......................... 439/502; 710/62; 439/955

(58) Field of Search ................................ 439/502, 660, 439/101, 955, 43; 710/62, 63, 68; 340/2.8; 703/27; 709/230

(56) References Cited

U.S. PATENT DOCUMENTS 6,006,295 A * 12/1999 Jones et al. ................... 710/62
6,418,501 B1 * 7/2002 Gama et al. ................ 710/305
6,546,440 B1 * 4/2003 Verinsky et al. .............. 710/62
6,563,714 B2 * 5/2003 Chang ........................ 361/752
2002/0049887 A1 * 4/2002 Takahashi .................. 711/115

* cited by examiner

*Primary Examiner*—Michael C. Zarroli
(74) *Attorney, Agent, or Firm*—Law Offices of John Chupa & Associates, P.C.

(57) ABSTRACT

An intelligent universal connector having 50 pins arranged into two parallel rows numbered from $1^{st}$ through $25^{th}$ for the right row and from $26^{th}$ through $50^{th}$ for the left row, the $1^{st}$ and $26^{th}$ pins being +12V power source, the $4^{th}$ and the $29^{th}$ pins being +5V power source, the $2^{nd}$, $3^{rd}$, $27^{th}$ and $28^{th}$ pins being grounding, the $5^{th}$ and $30^{th}$ pins being non, the pins of $6^{th}$ through $25^{th}$ and the pins of $31^{st}$ through $50^{th}$ corresponding to parallel ATA standard, the $41^{st}$, $42^{nd}$, $43^{rd}$ and $45^{th}$ pins being the two I/O signal terminals (HTX_P, HTX_M and HRX_P, HRX_M), the $28^{th}$, $3^{rd}$ and $2^{nd}$ pins being connectable to the $1^{st}$, $4^{th}$ and $7^{th}$ pins of a 7-pin serial ATA connector, the $41^{st}$, $42^{nd}$, $43^{rd}$ and $45^{th}$ pins being connectable to the two I/O signals of a 7-pin serial ATA connector, the $41^{st}$, $42^{nd}$, $43^{rd}$ and $45^{th}$ pins corresponding to grounding terminals of a parallel ATA connector.

5 Claims, 5 Drawing Sheets

| | PIN NUMBER | SIGNAL NAME | PIN NUMBER | SIGNAL NAME | |
|---|---|---|---|---|---|
| | 26 | +12V | 1 | +12V | |
| | 27 | GND | 2 | GND | ←S7 |
| S1→ | 28 | GND | 3 | GND | ←S4 |
| | 29 | +5V | 4 | +5V | |
| | 30 | | 5 | | |
| | 31 | | 6 | | |
| | 32 | | 7 | | |
| | 33 | | 8 | | |
| | 34 | | 9 | | |
| | 35 | | 10 | | |
| | 36 | | 11 | | |
| | 37 | | 12 | | |
| | 38 | | 13 | | |
| | 39 | | 14 | | |
| | 40 | | 15 | | |
| S2→ | 41 | HTX_P | 16 | | |
| S3→ | 42 | HTX_M | 17 | | |
| S5→ | 43 | HRX_P | 18 | | |
| | 44 | | 19 | | |
| S6→ | 45 | HRX_M | 20 | | |
| | 46 | | 21 | | |
| | 47 | | 22 | | |
| | 48 | | 23 | | |
| | 49 | | 24 | | |
| | 50 | | 25 | | |

| PIN NUMBER | SIGNAL NAME | PIN NUMBER | SIGNAL NAME |
|---|---|---|---|
| 2 | GND | 1 | RESET- |
| 4 | DD8 | 3 | DD7 |
| 6 | DD9 | 5 | DD6 |
| 8 | DD10 | 7 | DD5 |
| 10 | DD11 | 9 | DD4 |
| 12 | DD12 | 11 | DD3 |
| 14 | DD13 | 13 | DD2 |
| 16 | DD14 | 15 | DD1 |
| 18 | DD15 | 17 | DD0 |
| 20 | (key pin) | 19 | GND |
| 22 | GND | 21 | DMARQ |
| 24 | GND | 23 | DIOW |
| 26 | GND | 25 | DIOR- |
| 28 | CSEL | 27 | IORDY |
| 30 | GND | 29 | DMACK- |
| 32 | reserved | 31 | INTRQ |
| 34 | PEDIAG | 33 | DA1 |
| 36 | DA2 | 35 | DA0 |
| 38 | CS1 | 37 | CSO- |
| 40 | GND | 39 | DASP- |

Fig. 1
(Prior Art)

| PIN NUMBER | SIGNAL NAME |
|---|---|
| S1 | GND |
| S2 | HTX_P |
| S3 | HTX_M |
| S4 | GND |
| S5 | HRX_P |
| S6 | HRX_M |
| S7 | GND |

Fig. 2
(Prior Art)

| PIN NUMBER | SIGNAL NAME | PIN NAME | SIGNAL NAME |
|---|---|---|---|
| 26 | +12V | 1 | +12V |
| 27 | GND | 2 | GND |
| 28 | GND | 3 | GND |
| 29 | +5V | 4 | +5V |
| 30 | non | 5 | non |
| 31 | GND | 6 | RESET- |
| 32 | DD8 | 7 | DD7 |
| 33 | DD9 | 8 | DD6 |
| 34 | DD10 | 9 | DD5 |
| 35 | DD11 | 10 | DD4 |
| 36 | DD12 | 11 | DD3 |
| 37 | DD13 | 12 | DD2 |
| 38 | DD14 | 13 | DD1 |
| 39 | DD15 | 14 | DD0 |
| 40 | (key pin) | 15 | GND |
| 41 | GND | 16 | DMARQ |
| 42 | GND | 17 | DIOW- |
| 43 | GND | 18 | DIOR- |
| 44 | CSEL | 19 | IORDY |
| 45 | GND | 20 | DMACK- |
| 46 | reserved | 21 | INTRQ |
| 47 | PDIAG- | 22 | DA1 |
| 48 | DA2 | 23 | DA0 |
| 49 | CS1 | 24 | CSO- |
| 50 | GND | 25 | DASP- |

Fig. 3
(Prior Art)

| | PIN NUMBER | SIGNAL NAME | PIN NUMBER | SIGNAL NAME | |
|---|---|---|---|---|---|
| | 26 | +12V | 1 | +12V | |
| | 27 | GND | 2 | GND | ←S7 |
| S1→ | 28 | GND | 3 | GND | ←S4 |
| | 29 | +5V | 4 | +5V | |
| | 30 | | 5 | | |
| | 31 | | 6 | | |
| | 32 | | 7 | | |
| | 33 | | 8 | | |
| | 34 | | 9 | | |
| | 35 | | 10 | | |
| | 36 | | 11 | | |
| | 37 | | 12 | | |
| | 38 | | 13 | | |
| | 39 | | 14 | | |
| | 40 | | 15 | | |
| S2→ | 41 | HTX_P | 16 | | |
| S3→ | 42 | HTX_M | 17 | | |
| S5→ | 43 | HRX_P | 18 | | |
| | 44 | | 19 | | |
| S6→ | 45 | HRX_M | 20 | | |
| | 46 | | 21 | | |
| | 47 | | 22 | | |
| | 48 | | 23 | | |
| | 49 | | 24 | | |
| | 50 | | 25 | | |

Fig. 4

INTELLIGENT UNIVERSAL CONNECTOR

BACKGROUND OF THE INVENTION

1. Field of the Invention

The present invention relates to a universal connector and, more particularly, to an intelligent universal connector compatible to IDE (Integrated Drive Electronics) parallel ATA's 40-pin signal connector and serial AT attachment 7-pin signal connector.

2. Description of the Related Art

An IDE interface is a PC (personal computer)-to-storage medium (hard diskdrive or CD-ROM player) connection interface made in the form of a 40-pin socket or plug. As illustrated in FIG. 1, the 40 pins of an IDE interface are arranged in two lines, each having 20 pins. Therefore, an IDE interface is also called "parallel ATA specification".

Following fast development of new technology and strong demand for high signal transmission speed and high stability in signal transmission, serial ATA (SATA) standard has been established to fit IDE interface. This SATA standard, as shown in FIG. 2, is a 7-pin signal standard defined as follows: the first, fourth and seventh pins are grounding (GND), the second and third pins are HTX_P and HTX_M input/output signal; the fifth and sixth pins are HRX_P and HRX_M input/output signal. Because of the advantages of serial type signal transmission of fast transmission speed of low number of pins, SATA connectors will soon take over 40-pin connectors.

Currently, parallel ATA and serial ATA standards coexist in the market. The coexistence of these two standards in the market brings a great impact on computer peripheral apparatus. For example, a mobile computer peripheral rack has an IDE interface compatible 50-pin connector located on the outer rack and an IDE interface compatible 50-pin connector located on the inner box. When the two IDE interface compatible 50-pin connectors electrically connected, signal I/O is provided between the external computer and the internal storage medium (hard diskdrive). As illustrated in FIG. 3, the 50 pins of an IDE interface compatible 50-pin connector are defined as follows: the first and the 26$^{th}$ pins are +12V power source; the second, third, 27$^{th}$ and 28$^{th}$ pins are grounding (GND); the fourth and 29$^{th}$ pins are +5power source; the fifth and 30$^{th}$ pins are non; the pins numbered from 6~25 and the pins numbered from 31~50 are parallel 40-pin signal. The signals of the second, 19$^{th}$, 22$^{nd}$, 24$^{th}$, 26$^{th}$, 30$^{th}$ and 40$^{th}$ pins shown in FIG. 1 correspond to the grounding terminals of the 31$^{st}$, 15$^{th}$, 41$^{st}$, 42$^{nd}$, 43$^{rd}$, 45$^{th}$, and 50$^{th}$ pins shown in FIG. 3. If the storage medium installed in the inner box is a hard diskdrive fitting parallel ATA standard, it is not compatible to the serial ATA connector on the outer rack. Connecting these two non-compatible connectors together may cause the computer to down, or bring a severe damage to the motherboard.

SUMMARY OF THE INVENTION

The present invention has been accomplished under the circumstances in view. It is therefore the main object of the present invention to provide an intelligent universal connector, which is compatible to IDE (Integrated Drive Electronics) parallel ATA's 40-pin signal connector and serial AT attachment 7-pin signal connector. According to the present invention, the intelligent universal connector comprises 50 pins arranged into a left row of pins and a right row of pins parallel to the left row of pins. The pins of the right row of pins are numbered from 1$^{st}$ through 25$^{th}$ in direction from the top side toward the bottom side. The pins of the left row of pins are numbered from 26$^{th}$ through 50$^{th}$ in direction from the top side toward the bottom side. The 1$^{st}$ and 26$^{th}$ pins are +12V power source. The 4$^{th}$ and the 29$^{th}$ pins are +5V power source. The 2$^{nd}$, 3$^{rd}$, 27$^{th}$ and 28$^{th}$ pins are grounding. The 5$^{th}$ and 30$^{th}$ pins are non. The pins of 6$^{th}$ through 25$^{th}$ and the pins of 31$^{st}$ through 50$^{th}$ correspond to parallel ATA standard. The 41$^{st}$, 42$^{nd}$, 43$^{rd}$ and 45$^{th}$ pins are the two I/O signal terminals (HTX_P, HTX_M and HRX_P, HRX_M). The 28$^{th}$, 3$^{rd}$ and 2$^{nd}$ pins are connectable to the 1$^{st}$, 4$^{th}$ and 7$^{th}$ pins of a 7-pin serial ATA connector. The 41$^{st}$, 42$^{nd}$, 43$^{rd}$ and 45$^{th}$ pins are connectable to the two I/O signals of a 7-pin serial ATA connector. The 41$^{St}$, 42$^{nd}$, 43$^{rd}$ and 45$^{th}$ pins correspond to grounding terminals of a parallel ATA connector.

BRIEF DESCRIPTION OF THE DRAWINGS

FIG. 1 is a pin definition table of a 40-pin connector according to the prior art;

FIG. 2 is a pin definition table of a SATA 7-pin connector according to the prior art;

FIG. 3 is a pin definition table of an IDE interface 50-pin connector according to the prior art;

FIG. 4 is a pin definition table of a 50-pin intelligent universal connector according to the present invention;

DETAILED DESCRIPTION OF THE PREFERRED EMBODIMENT

Figure 5A:
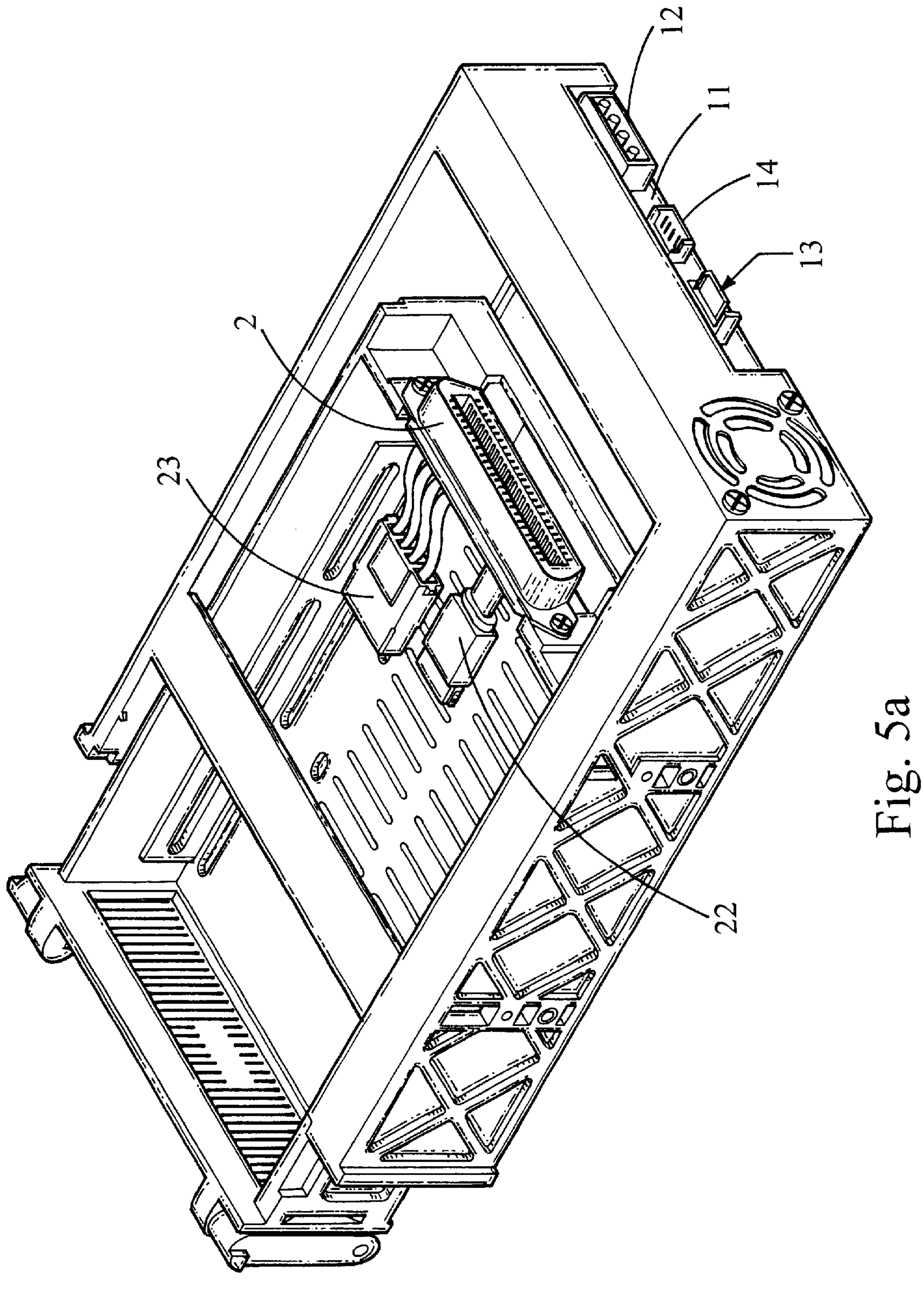
FIG. 5*a* shows an application example of the present invention.
Figure 5B:
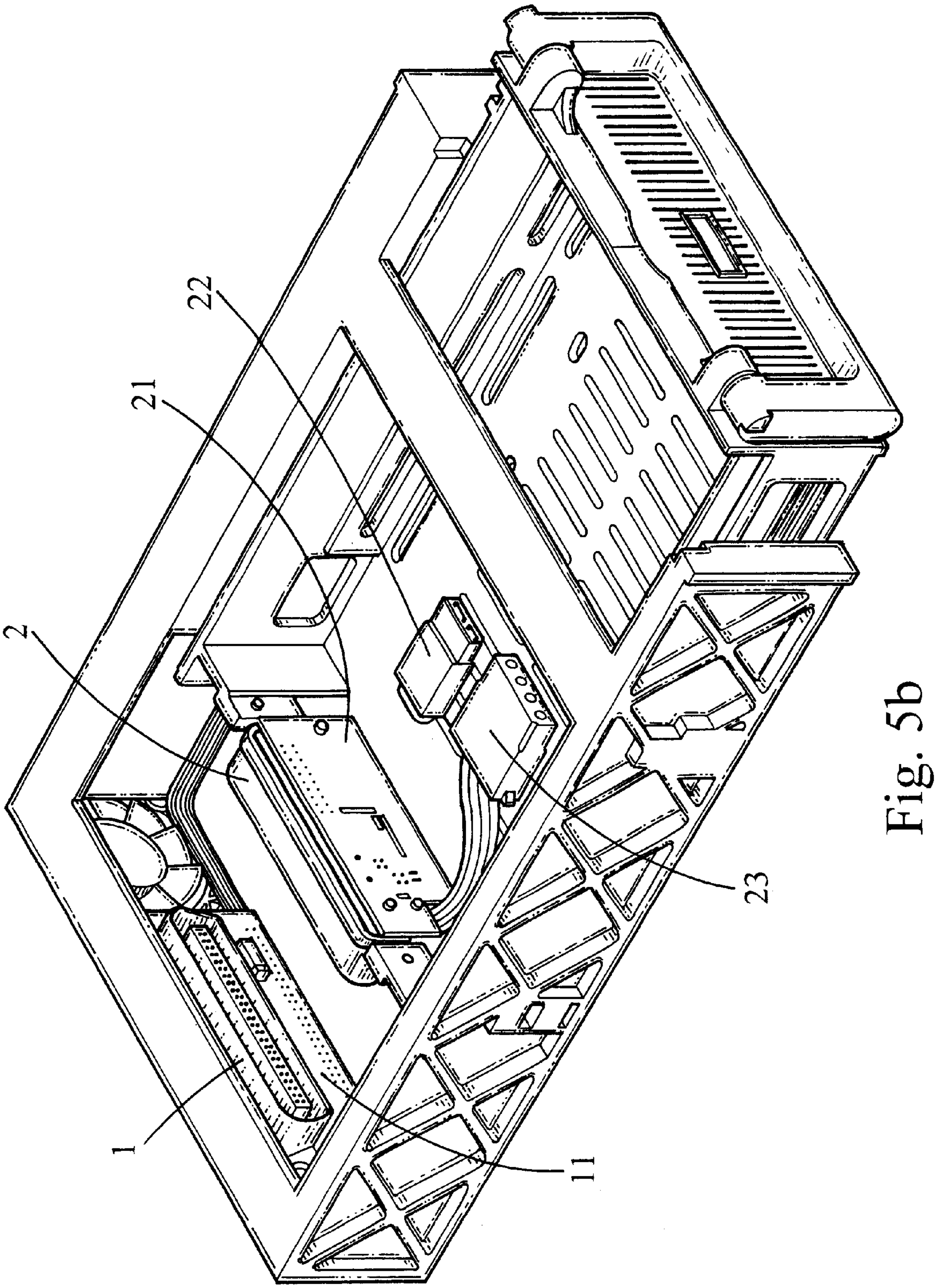
FIG. 5*b* is similar to FIG. 5*a* but viewed from another angle.

Referring to FIGS. 4, 5*a* and 5*b*, an intelligent universal connector in accordance with the present invention has 50 pins arranged into two parallel rows, namely, the left row and the right row. The pins of the right row are numbered from 1$^{st}$ through 25$^{th}$ in direction from the top side toward the bottom side. The pins of the left row are numbered from 26$^{th}$ through 50$^{th}$ in direction from the top side toward the bottom side. The 1$^{st}$ and 26$^{th}$ pins, which are +12V power source, and the 4$^{th}$ and the 29$^{th}$ pins, which are +5V power source, are respectively connected to a power input socket 12, which is fixedly mounted on a circuit board 11. The 2$^{nd}$, 3$^{rd}$, 27$^{th}$ and 28$^{th}$ pins are grounding (GND). The 5$^{th}$ and 30$^{th}$ pins are non. The circuit board 11 has a 7-pin SATA connector 13 fixedly mounted thereon. The 7-pin SATA connector 13 has 7 pins numbered from S1-S7. The S1, S4 and S7 pins are grounding (GND) and respectively connected to the 28$^{th}$, 3$^{rd}$ and 2$^{nd}$ pins of the connector 1. The S2, S3, S5 and S6 pins are respectively connected to the I/O signals of the 41$^{st}$, 42$^{nd}$, 43$^{rd}$ and 45$^{th}$ pins of a 50-pin connector as shown in FIG. 3, so that HTX_P, HTX_M, HRX_P and HRX_M I/O signals can be realized in a conventional 50-pin connector compatible to a 50-pin connector for mobile computer peripheral rack.

When the aforesaid arrangement employed to a mobile computer peripheral rack, the 7-pin IDE connector of the outer rack is installed in the housing of the computer and connected to the mother board by a signal line. When the inner box inserted into the outer rack, the two connectors 1 and 2 are electrically connected. If the storage medium in the inner box is of a serial ATA design, the three grounding pins are respectively connected to the 28$^{th}$, 3$^{rd}$ and 2$^{nd}$ pins of the outer rack connector 1, and the other two I/O signals (HTX_P, HTX_M and HRX_P, HRX M) are respectively connected to the $41^{st}$, $42^{nd}$, $43^{rd}$ and $45^{th}$ pins of the outer rack connector 1. At this time, the computer is accessible to the storage medium in the inner box of the mobile computer peripheral rack.

However, if the storage medium in the inner box is of parallel ATA standard, the $41^{st}$, $42^{nd}$, $43^{rd}$ and $45^{th}$ pins of the inner box connector 2 are respectively connected to the $41^{st}$, $42^{nd}$, $43^{rd}$ and $45^{th}$ pins of the outer rack connector 1 and grounded, without causing "startup". Therefore, the installation of a storage medium of parallel ATA standard neither causes the computer to down nor brings a severe damage to the motherboard.

The $5^{th}$ and $30^{th}$ pins of the outer rack connector 1 are non. Same as when indicated in U.S. patent application Ser. No. 09/983,374, +D and −D signals of a USB interface can be connected to the $5^{th}$ and $30^{th}$ pins of the outer rack connector 1. The two grounding terminals and one power terminal (+5V) are respectively connected to the $2^{nd}$, $3^{rd}$, $27^{th}$ or $28^{th}$, and the $4^{th}$ or $29^{th}$ pins. Therefore, the connector provides an IDE interface and a USB interface.

Referring to FIGS. 5*a* and 5*b* again, the circuit layout of the circuit board 11 of the outer rack connector 1 meets the aforesaid pin definitions, and is mounted with a serial ATA signal connector 13, a USB signal connector 14, and a power input socket 12. The inner box connector 2 is connectable to the outer rack connector 1. The circuit board 21 of the inner box connector 2 has a serial signal bus line 22 and a power output plug 23 for the connection of a storage medium.

A prototype of intelligent universal connector has been constructed with the features of FIGS. 4, 5*a* and 5*b*. The intelligent universal connector functions smoothly to provide all of the features discussed earlier.

Although a particular embodiment of the invention has been described in detail for purposes of illustration, various modifications and enhancements may be made without departing from the spirit and scope of the invention. Accordingly, the invention is not to be limited except as by the appended claims.

What the invention claimed is:

1. An intelligent universal connector comprising 50 pins arranged into a left row of pins and a right row of pins parallel to said left row of pins, the pins of said right row of pins being numbered from $1^{st}$ through $25^{th}$ in direction from the top side toward the bottom side, the pins of said left row of pins being numbered from $26^{th}$ through $50^{th}$ in direction from the top side toward the bottom side, the $1^{st}$ and $26^{th}$ pins being +12V power source, the $4^{th}$ and the $29^{th}$ pins being +5V power source, the $2^{nd}$, $3^{rd}$, $27^{th}$ and $28^{th}$ pins being grounding, the $5^{th}$ and $+^{th}$ pins being non, the pins of $6^{th}$ through $25^{th}$ and the pins of $31^{st}$ through $50^{th}$ corresponding to parallel ATA standard, the $41^{st}$, $42^{nd}$, $43^{rd}$ and $45^{th}$ pins being the two I/O signal terminals (HTX_P, HTX_M and HRX_P, HRX_M), the $28^{th}$, $3^{rd}$ and $2^{nd}$ pins being connectable to the $1^{st}$, $4^{th}$ and $7^{th}$ pins of a 7-pin serial ATA connector, the $41^{st}$, $42^{nd}$, $43^{rd}$ and $45^{th}$ pins being connectable to the two I/O signals of a 7-pin serial ATA connector, the $41^{st}$, $42^{nd}$, $43^{rd}$ and $45^{th}$ pins corresponding to grounding terminals of a parallel ATA connector.

2. The intelligent universal connector as claimed in claim 1, wherein the $5^{th}$ and $30^{th}$ pins are connectable to +D and −D signals of a USB interface.

3. The intelligent universal connector as claimed in claim 1, further comprising a circuit board, said circuit board comprising a power input socket and a serial ATA signal connector respectively electrically connected to the corresponding pins thereof.

4. The intelligent universal connector as claimed in claim 3, wherein said circuit board further comprises a USB interface signal connector electrically connected to the corresponding pins thereof.

5. The intelligent universal connector as claimed in claim 1, further comprising a circuit board, said circuit board comprising a power output plug and a serial ATA signal bus respectively electrically connected to the corresponding pins thereof.

* * * * *